Oct. 11, 1927.　　　　　　　　　　　　　　　1,644,978
B. F. CHILDERS
TRACTOR
Filed Feb. 21, 1925　　　　　2 Sheets-Sheet 2
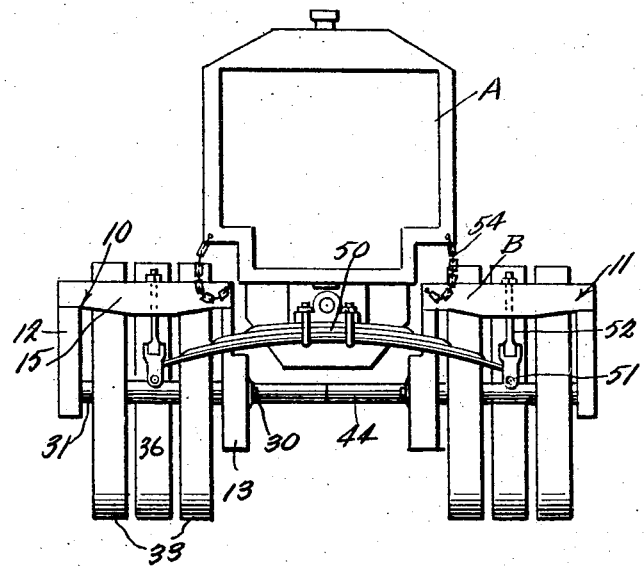
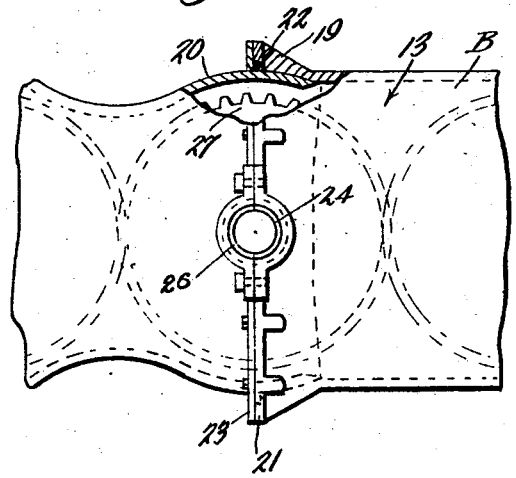
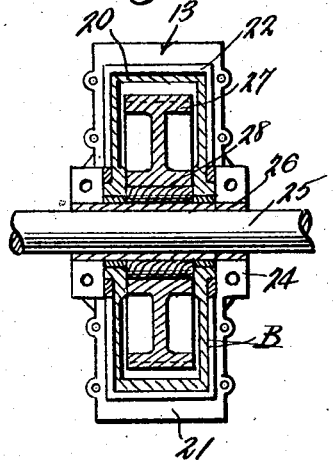
Witnesses:
Inventor
BERY F. CHILDERS.
By Richard B. Owen
Attorney Patented Oct. 11, 1927.

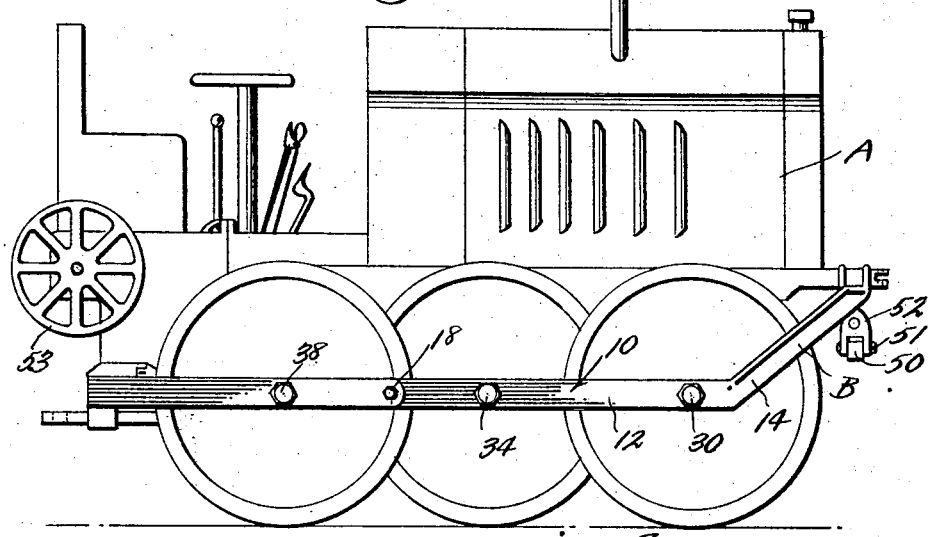
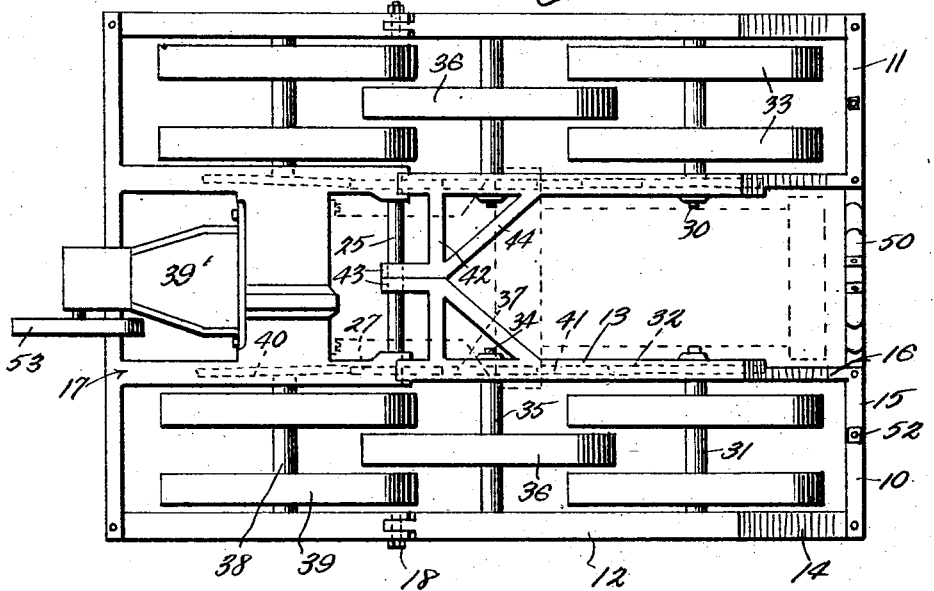

1,644,978

UNITED STATES PATENT OFFICE.

BERY F. CHILDERS, OF EDGEMONT, SOUTH DAKOTA.

TRACTOR.

Application filed February 21, 1925. Serial No. 10,917.

This invention appertains to tractors and is an improvement over my Patent Number 1,497,327 granted to me June 10, 1924.

The primary object of the present invention is to provide an improved tractor of the character shown in my above mentioned patent embodying a flexible frame, whereby all of the drive wheels are enabled to keep on the ground at once regardless of the contour of the ground over which the tractor may be travelling.

Another object of the invention is the provision of novel frames disposed on each side of the tractor for supporting independent sets of staggeredly arranged drive wheels, and novel means for connecting the frames to the body of the tractor.

A further object of the invention is the provision of novel means for constructing the side frames carrying the drive wheels, whereby the forward portions of the frames are permitted to swing relative to the rear portion of the frames, and novel means for driving the drive wheels carried by the frames irrespective of the swinging movement thereof.

A still further object of the invention is to simplify tractors of the crawler type and to render the same durable and efficient in use.

With these and other objects in view, the invention consists in the novel construction, arrangement and formation of parts, as will be hereinafter more specifically described, claimed and illustrated in the accompanying drawings, in which drawings, Figure 1 is a side elevation of the improved tractor, Figure 2 is a plan view showing the improved flexible side frames and the drive wheels carried thereby, the engine, and body of the tractor being shown removed, Figure 3 is a front elevation of the improved tractor, Figure 4 is a side elevation partly broken away showing a portion of one of the side frames carrying the driving gears, Figure 5 is a transverse section through the inner beam of one of the side frames illustrating the means of arranging one of the drive gears therein.

Referring to the drawings in detail, wherein similar reference characters designate corresponding parts throughout the several views the letter A generally indicates the improved tractor and B the novel running gear therefor.

The running gear B embodies a pair of spaced side frames 10 and 11 for supporting the drive wheels of the tractor.

Each of the side frames 10 and 11 include an outer solid beam 12 and an inner hollow beam or housing 13. The forward terminals of the inner and outer beams 12 and 13 are bent upwardly as at 14 and connected together by a front transverse bar 15.

The frames 10 and 11 are divided transversely at a point in rear of the transverse center of the tractor into a main front section 16 and a rear section 17.

As shown the outer beams 12 of the frames 10 and 11 have the front and rear sections thereof connected by means of pivot bolts 18 which extend through ears formed on the meeting terminals of the sections of the said beam.

The inner hollow beams or housings 13 also including a front and a rear section which are connected together in a novel manner as shown in Figures 4 and 5 of the drawing.

The rear terminals of the front sections of the hollow beams or housings 13 are flared at their upper and lower ends as at 19, while the forward terminals of the rear sections of the hollow beams or housings are provided with arcuate upper and lower extensions 20 which snugly fit within the flared portion 19 of the forward section of the hollow beams or housings.

These hollow beams or housings are filled with oil or grease in order that the drive gears mounted therein, as will be hereinafter more fully described, will at all times run free. A flange 21 is formed on the rear face of the front sections of the hollow beams or housings and these flanges are rabbeted to provide a seat for a packing 22 for engaging the outer face of the rear sections of the said hollow beams. The packing 22 is held in place by means of an open plate 23 which is bolted to the flange 21. The open plate 23 of the flange 21 carries bearings 24 for the reception of a shaft 25 for a purpose, which will be hereinafter more fully described.

As clearly shown in Figure 5 of the drawing the shaft 25 is mounted within a sleeve 26 in each one of the housings and a drive gear 27 disposed within the housings is rotatably mounted on the sleeve. If so desired roller bearings 28 can be interposed between the sleeves and the said driving gears 27.

The front sections of the frames 10 and 11 forwardly of the transverse center of the tractor carry stub shafts 30 which extend through the inner hollow beams 13 and the outer solid beams 12. These shafts 30 have rotatably mounted thereon hub sleeves 31 and the inner ends of the sleeves have keyed or otherwise secured thereto drive gears 32 which are mounted directly within the hollow beam. The sleeves 31 have secured thereto in any desired way a pair of spaced ground wheels 33 as clearly shown in Figure 2 of the drawing. The front sections of the frames 10 and 11 directly at the transverse center of the tractor also carry stub shafts 34 on which are mounted sleeves 35 which have keyed thereto drive ground wheels 36 which are arranged intermediate the pairs of ground wheels 33. The inner ends of the sleeves extend into the hollow beams or housings 13 and have keyed or otherwise secured thereto drive gears 37.

The rear sections of the frames 10 and 11 also support shafts 38 on which are mounted pairs of ground wheels 39 and these ground wheels 39 are arranged on each side of the ground wheels 36. It thus can be seen that the drive ground wheels extend throughout the full length of the frame and that the drive wheels are arranged in staggered relation relative to one another. The axle 38 extends through the inner hollow beams or housings 13 into the transmission casing 39'.

The portion of the axles 38 which extend through the hollow beams or housings 13 have secured thereto drive gears 40 and the drive gears 40 and the drive gears 37 are operatively connected together by the idle gears 27 which are carried by the shaft 25 as heretobefore described. The gears 37 and 32 are operatively connected together by gears 41 carried by stub shafts not shown mounted within the hollow beams 13.

Each of the hollow beams 13 of the front sections of the frames 10 and 11 carry inwardly directed brace arms 42 and these brace arms in turn carry bearings 43 which are rotatably mounted upon the shaft 25. The arms 42 can be further braced by diagonally extending arms 44 also clearly shown in Figure 2 of the drawing.

Now the engine, crank case and other parts of the tractor A are placed directly on the frames 10 and 11 and the crank case, transmission and the like forms a rigid frame to which the side frames 10 and 11 can be secured to.

As clearly shown in Figure 3 of the drawing the forward end of the crank case of the engine supports a front leaf spring 50 and the terminals of the leaf spring 50 are pivotally connected as at 51 to hangers 52 which are bolted to the connecting front beam 15 of the side frames 10 and 11 at the transverse centers thereof.

This connection permits independent movement of a front section of the frames 10 and 11 relative to one another and movement of the front section of the frames relative to the rear sections of the frame.

The transmission housing 39 supports any preferred type of belt pulley 53 which is driven in any preferred way from the transmission (not shown). The transmission is of the usual or any preferred type.

From the foregoing description, it can be seen that I have provided a novel tractor of the crawler type, in which the frame can readily conform to the contour of the ground over which the same may be travelling.

Changes as in details may be made without departing from the spirit or the scope of this invention, but:—

What I claim as new is:—

1. In a tractor, a running gear including a pair of longitudinally extending side frames, each of said frames consisting of an outer beam and an inner spaced hollow beam, means connecting the terminals of the beams together, axles rotatably supported by said beams, drive gears mounted within the hollow beams and connected to the axles, means connecting all of the drive gears together, each of said side frames including independent sections, and means pivotally connecting the sections together at a point between certain pair of ground wheels.

2. In a tractor of the crawler type, a pair of independent side frames each including an outer beam and a spaced hollow inner beam forming a gear housing, spaced axles carried by the beams, pairs of spaced drive ground wheels mounted upon certain of the axles, a single drive ground wheel mounted upon certain other of the axles and arranged between the pairs of the first mentioned ground wheels, drive gears in the hollow beams connected with the axles, idle gears mounted within the hollow beams operatively connecting the drive gears together, a drive engine including a crank case and a transversely extending leaf spring secured at the central portion thereof to the forward end of the crank case, and means securing the terminals of the spring to the side frames at the forward ends thereof.

3. In a tractor, a running gear including a pair of independent spaced longitudinally extending side frames, each of said side frames including an outer beam and an inner spaced parallel hollow beam, transverse beams connecting the terminals of the beams together, drive ground wheels disposed between the beams of the frames and extending substantially the entire lengths of the frames, each of the frames including an independent front section and a rear section, pivot bolts connecting the meeting ends of the outer beams of the sections together, the rear terminals of the front sections of the hollow beams having flared upper and lower ends, the forward terminals of the rear section of the hollow beam including arcuate extensions fitted within the flared portions of the rear terminals of the front sections of the hollow beams, gearings disposed in said hollow beams for driving the ground wheels, the hollow beams being adapted to receive a lubricant, a gasket carried by the rear terminals of the front sections of the hollow beams, means holding the gasket in position, a transversely extending shaft extending through the side walls of the sections of the hollow beams, rearwardly extending arms carried by the front sections of the beams, and hinge barrels carried by said arms rotatably carried by the last mentioned shaft.

In testimony whereof I affix my signature.

BERY F. CHILDERS.